United States Patent
McKay, Sr.

[11] 3,900,738
[45] Aug. 19, 1975

[54] NON-CONTACT MEASURING GAUGE

[75] Inventor: Russell M. McKay, Sr., Los Altos, Calif.

[73] Assignee: Lockheed Missiles & Space Company, Inc., Sunnyvale, Calif.

[22] Filed: May 23, 1973

[21] Appl. No.: 363,185

[52] U.S. Cl. .............. 250/560; 250/561; 356/156
[51] Int. Cl.² ......................................... G01N 21/30
[58] Field of Search ............ 250/219 WD, 219 LG, 250/219 TH, 250/219 DR, 221, 222, 223, 250/560, 561; 356/156, 157, 159, 160, 167

[56] References Cited
UNITED STATES PATENTS

| | | | |
|---|---|---|---|
| 2,738,007 | 3/1956 | Power | 250/219 LG |
| 3,141,057 | 7/1964 | Acton | 356/159 |
| 3,233,506 | 2/1966 | Hart | 250/219 LG |
| 3,309,958 | 3/1967 | Simon | 356/167 |
| 3,415,433 | 12/1968 | Shaw | 250/219 LG |
| 3,421,819 | 1/1969 | Anderson | 250/219 LG |
| 3,423,592 | 1/1969 | Selgin | 356/167 |
| 3,518,441 | 6/1970 | Selgin | 356/156 |
| 3,598,978 | 8/1971 | Rempert | 250/219 WD |
| 3,628,025 | 12/1971 | Kieferle | 250/222 |
| 3,658,428 | 4/1972 | Voigtlaender-Tetzner | 356/160 |
| 3,665,202 | 5/1972 | McLeman | 250/219 WD |
| 3,710,128 | 1/1973 | Kubisiak | 250/219 WD |
| 3,730,633 | 5/1973 | Kennedy | 250/222 |
| 3,742,222 | 6/1973 | Endl | 250/219 LG |
| 3,746,451 | 7/1973 | Croissant | 356/159 |
| 3,749,500 | 7/1973 | Carlson | 350/167 |

*Primary Examiner*—James W. Lawrence
*Assistant Examiner*—D. C. Nelms
*Attorney, Agent, or Firm*—H. Donald Volk; Billy G. Corber

[57] ABSTRACT

A non-coherent light source is used to measure the position of an object. Two photodetector systems are used and the object to be measured is allowed to partially block the light impinging on one of the photodetector systems. The difference between the output from the two photodetector systems represents the position of the object.

6 Claims, 2 Drawing Figures

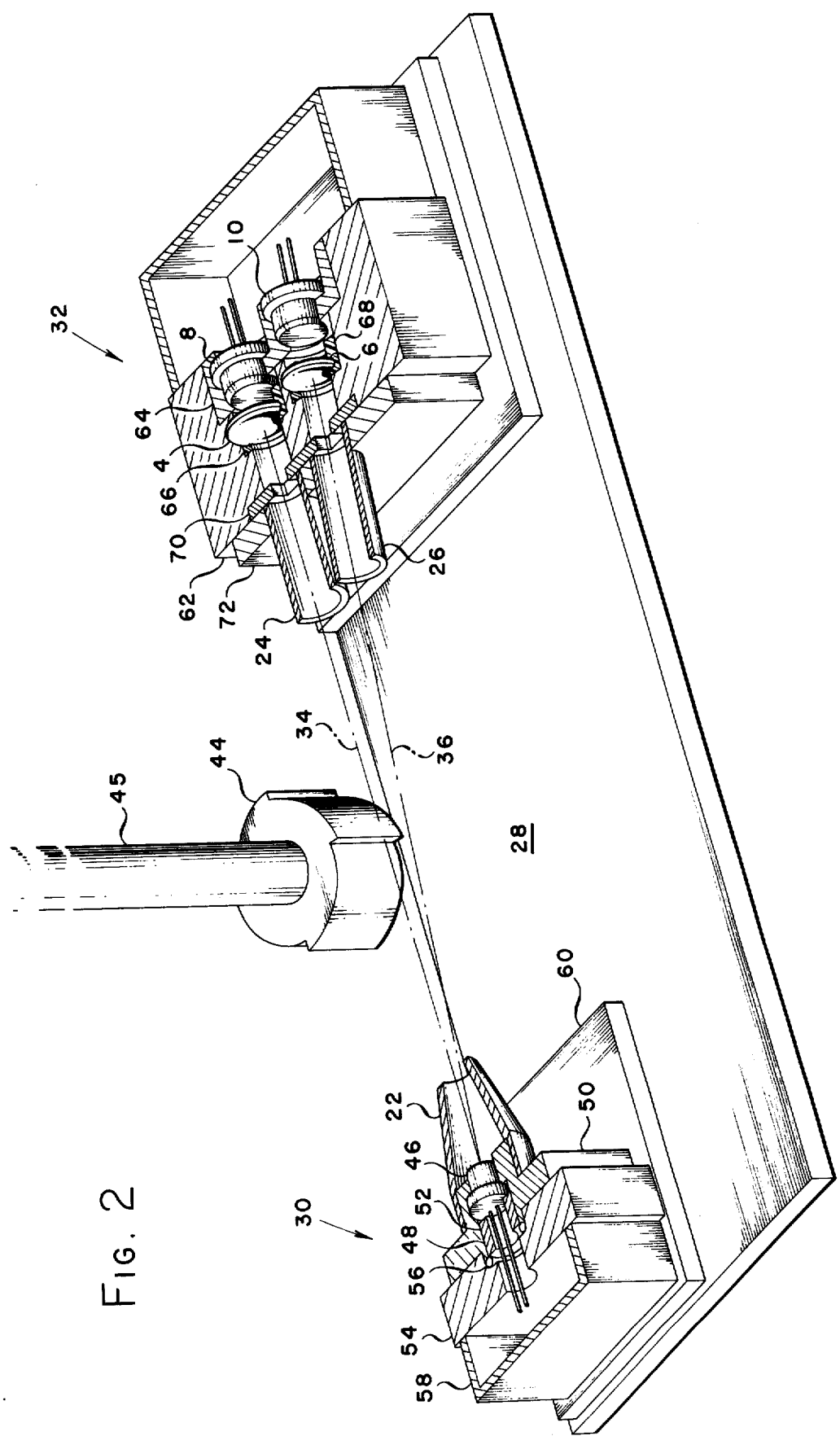

NON-CONTACT MEASURING GAUGE

BACKGROUND OF THE INVENTION

This invention relates generally to precision measuring instruments and, more particularly, to an optical or non-contact measuring gauge for measuring the position of a tool or other article. The non-contact measuring system, of which this gauge is a part, is shown in co-pending U.S. Patent application No. 322,708, filed Jan. 11, 1973, entitled "Cutter Monitor", now U.S. Pat. No. 3,795,449. That invention was made by the same applicant and is assigned to the same assignee.

Many types of optical inspection devices have been utilized to detect flaws or other irregularities on the surface of an item. See, for example, the U.S. patent to Hoffman, No. 3,046,407, and the U.S. patent to Burgo et al, No. 3,206,606 which relate to optical sensing devices wherein a light is directed onto a surface to be inspected and the intensity of the reflected light (or the mere presence of the reflected light) is detected by a photosensitive detection means.

These types of devices, however, suffer from a disadvantage of inaccuracy because they are so slow in responding to changes in light intensity. Moreover, these devices are usable only to measure flaws or irregularities on the surface and are not usable to determine the precise elevation of the inspected surface.

Hereinbefore, where the primary intent was to measure the elevation of a surface, mechanical means has generally been utilized. In accordance with such apparatus, a small mechanical probe is caused to bare against the surface to be measured so that the elevation can be read off of a gauge. A disadvantage of such a mechanical device is that the apparatus is not precise and may, in fact, cause distortion of the surface to be measured. Furthermore, such apparatus is incapable of measuring machine tools such as a cutter, which has a plurality of teeth, since one would have to stop and measure the elevation of the leading surface of each and every tooth to find the elevation of the highest tooth.

Whereas, the prior art mechanical measuring devices have been subject to numerous disadvantages, a new approach to the problem of measuring the elevation of a surface has been taken in accordance with the present invention in order to overcome these disadvantages.

SUMMARY OF THE INVENTION

The apparatus of the present invention includes a noncoherent light source for illuminating a pair of photodetector systems. The two photo-detector systems produce an output signal responsive to the position of the object to be measured. Each photodetector system includes a light shield for deflecting spurious radiant energy, a focusing lens, a plate having a rectangular aperture for passing only a rectangular shaped light image to the photodetector, and a photodetector for receiving the image.

One advantage of the present invention over related measuring techniques is that it is not subject to damage by unfriendly environments such as temperature and humidity. It also is resistant to damage by cutting oil, falling chips and other machine shop hazards.

Still other objects and advantages of the present invention will become apparent to those skilled in the art after having read the foregoing detailed description and the several figures of the drawings showing the preferred embodiment.

IN THE DRAWINGS

FIG. 2 is a perspective view, partially in cross-section, of a non-contact measuring gauge apparatus or the like in accordance with the present invention.

DETAILED DESCRIPTION OF THE PREFERRED EMBODIMENT

Figure 1:
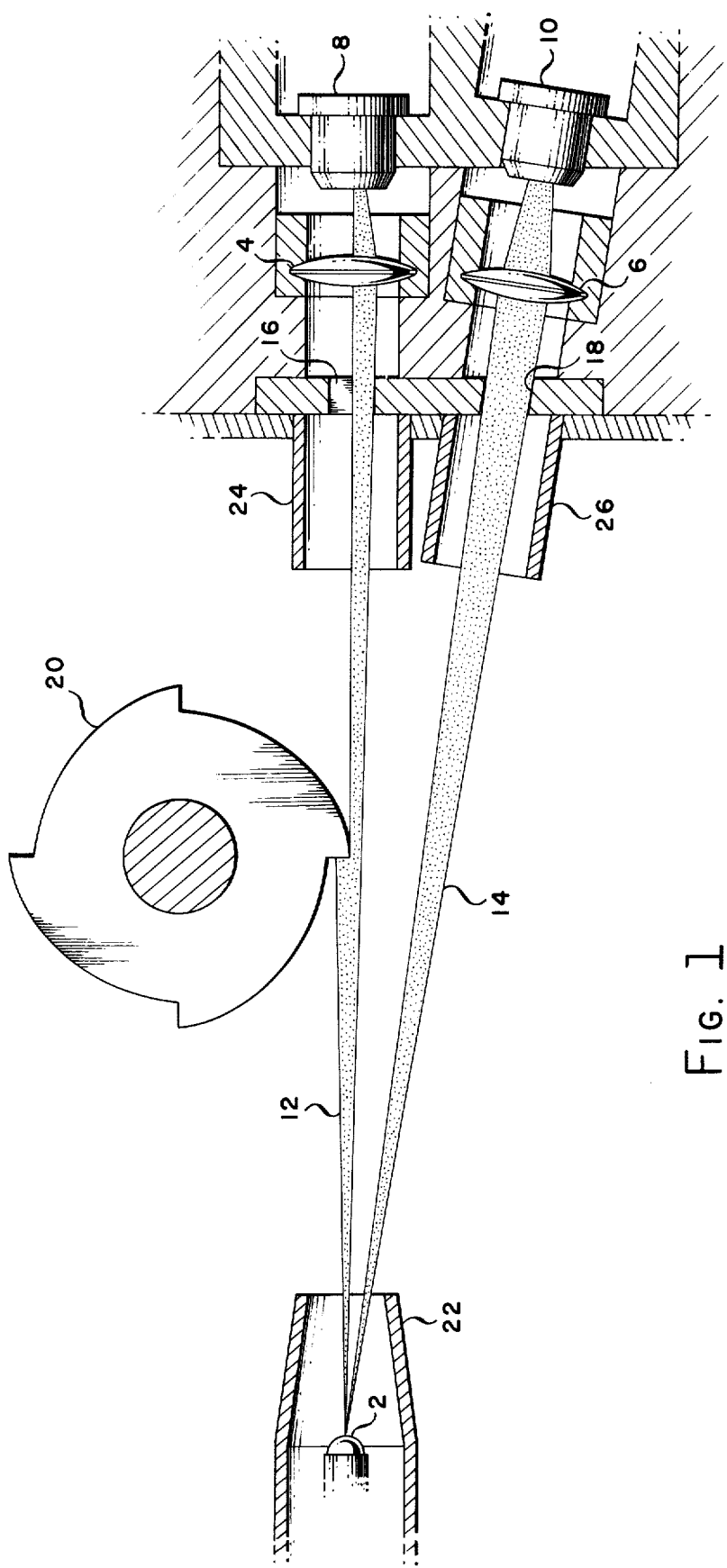
FIG. 1 is a diagramatical representation showing the method of operation of the present invention.

Referring now to FIG. 1 of the drawing, the method of operation of the present invention is illustrated. A source of radiant energy 2 is used to provide a beam of light. Although only the measuring beam 12 and the reference beam 14 are shown, it is understood that the source of radiant energy 2 radiates in all directions, only two portions being shown for clarity. The beam of light is passed through lens systems 4 and 6 respectively, the optical axis of which are aligned with the source of radiant energy 2. The rays of light passing to lens systems 4 and 6 respectively are partially blocked by masking aperture 16 and 18 respectively and the unblocked portion focus at the surface of photodetectors 8 and 10 respectively. The object 20 to be measured is positioned so that it partially blocks measuring beam 12. Since both photodetector systems are identical and equally distant from the source of radiant energy 2, their outputs will be identical when the light beams are not blocked by an object to be measured. When object 20 partially blocks measuring beam 12 as shown, the difference in the output from photodetector 8 and 10 will be proportional to the location of object 20 and this output can be used to measure the location of object 20. Light shields 24 and 26 shield lens systems 4 and 6 from receiving spurous radiant energy from sources other than source 2. Aperture shield 22 protects the source of radiant energy 2 from mechanical damage and also inhibits contaminants such as cutting oil or chips from interfering with the operation of source 2.

The present invention as diagramatically illustrated in FIG. 1 can be utilized to measure an object or the location of an object. It will be apparent that the object being measured can be metal, wood or plastic, so long as the object is opaque.

Turning now to FIG. 2 of the drawings, a practical application of the invention is illustrated in the forms of a means for measuring the location of the highest tooth of a cutting tool 44. In accordance with this embodiment, cutting tool 44 is mounted on a rotating shaft 45 which is rotatably driven so that every tooth of the cutter 44 has an opportunity to cut the measuring beam 34.

An emitter subassembly 30 and a detector subassembly 32 are mounted on base plate 28. A light source 46, such as a gallium arsenide light emitting diode, is mounted within an emitter subassembly 30 and emits a non-coherent light beam. Although the light beam emitted covers a large area, only two distinct portions 34 and 36 are shown for clarity. Two photodetectors are mounted witin detector subassembly 32 and arranged to receive the two portions of the light beam as will be explained below.

A light source 46, such as a gallium arsenide light emitting diode is inserted in cylindrical aperture 48 of hat shaped collar 50. Mounting bushing 52, which is threaded within collar 50, presses light source 46 against the front retainer shoulder of collar 50. Collar 50 is rigidly affixed to the front of bracket 54 by bolts or any other well known means. An O-ring 56 forms a seal between bracket 54 and mounting bushing 52. Cover 58 is mounted to the back of bracket 54 to seal the assembly. Emitter base 60 mounts bracket 54 to one end of base plate 28. Bracket 54 and emitter base 60 can be made integral if desired.

Conical shaped aperture shield 22 is threaded onto the front of collar 50 to protect light source 46 from mechanical damage and to inhibit damage by cutting oil, chips and other contaminents.

The inverted T-shaped detector housing 62 is rigidly mounted to the other end of base plate 28. Detector housing 62 defines a pair of apertures with a common undercutting in the rear of the detector housing; the apertures extend through the front of detector housing and are aligned with light source 46. Photodetector 8 and photodetector 10 are rigidly mounted in the pair of apertures by mounting adapter 64. A first mounting bushing 66 supports lens system 4 in alignment with light source 46 and photodetector 8 to focus measuring beam 34 on photodetector 8. A second mounting bushing 68 supports lens system 6 in alignment with light source 46 and photodetector 10 to focus reference beam 36 on photodetector 10.

A mask 70 defining a first and second rectangular aperture is rigidly affixed to the front of detector housing 62 by plate 72. The first and second aperture of mask 70 are aligned with light source 46 so that a portion of measuring beam 34 and reference beam 36 is blocked so that only a rectangular portion is allowed to pass and impinge on photodetector 8 and photodetector 10 respectively. A first light shield 24 and a second light shield 26 are threaded to plate 72 aligned with photodetector 8 and photodetector 10 respectively.

Other modifications and advantageous applications of this invention will become apparent to those having ordinary skill in the art. Therefore, it is intended that the matter contained in the foregoing description and the accompanying drawings be interpreted as illustrative and not limitative, the scope of the invention being defined by the appended claims.

What is claimed is:

1. In a non-contact measuring gauge the improvement comprising:
    a base comprising an elongated flat member,
    means for producing a non-coherent light rigidly affixed to said base,
    a detector housing rigidly affixed to said base,
    said detector housing including a face plate defining a first aperture and a second aperture,
    a first detector mounted within said detector housing aligned with said first aperture,
    a second detector mounted within said detector housing aligned with said second aperture,
    a first lens system and a second lens system coaxially mounted between said means for producing non-coherent light and said first detector and said second detector respectively for focusing said non-coherent light on said detectors,
    said first and second detector positioned equal radial distance from said non-coherent light means and aligned to simultaneously receiving radiation from said non-coherent light means, whereby
    said detectors generate an output in response to and proportional to the non-coherent light impinging on said detectors.

2. A non-contact measuring gauge according to claim 1 wherein said means for producing a non-coherent light is a light emitting diode and said first and second detector means are photo-detectors.

3. A non-contact measuring gauge according to claim 2 wherein said first and second apertures are rectangular.

4. A non-contact measuring gauge according to claim 3 including a first elongated cylindrical light shield coaxial with said first aperture and a second elongated cylindrical light shield coaxial with said second aperture for shielding said detectors from spurious light.

5. A detection system for simultaneously receiving non-coherent light from a single source comprising:
    means for producing a non-coherent light,
    a first photodetector system mounted to receive radiation from said non-coherent light producing means,
    said first photodetector system comprising in coaxial optical alignment a first photodetector, a first cylindrical light shield disposed between said means for producing a non-coherent light and said first photodetector, and a face plate defining a first rectangular aperture for passing only a rectangular shaped light image to said first photodetector,
    a second photodetector system mounted to receive radiation from said non-coherent light producing means,
    said second photodetector system comprising in coaxial optical alignment a second photodetector, a second cylindrical light shield disposed between said means for producing a non-coherent light and said second photodetector so as to restrict incident light from striking said photodetector, and a face plate defining a second aperture for passing only a rectangular shaped light image to said second photodetector,
    and wherein said first and second photodetectors are positioned equal radial distance from said non-coherent light means,
    whereby said first and second photodetectors generate outputs response to the non-coherent light impinging on said detectors.

6. A detection system according to claim 5 wherein said means for producing a non-coherent light is a light emitting diode.

* * * * *